United States Patent [19]

Landy, Jr.

[11] 3,832,544

[45] Aug. 27, 1974

[54] LINE TRACING APPARATUS

[75] Inventor: Arney Landy, Jr., St. Paul, Minn.

[73] Assignee: Andrew Engineering Company, Hopkins, Minn.

[22] Filed: Mar. 22, 1973

[21] Appl. No.: 343,858

[52] U.S. Cl. .................. 250/202, 250/209, 318/577
[51] Int. Cl. .............................................. G05b 1/00
[58] Field of Search ........... 250/202, 208, 209, 234; 318/577; 250/556

[56] References Cited

UNITED STATES PATENTS

| | | | |
|---|---|---|---|
| 3,335,287 | 8/1967 | Hargens | 250/202 X |
| 3,369,123 | 2/1968 | Bardwell et al. | 250/202 |
| 3,423,589 | 1/1969 | Bardwell et al. | 250/202 |
| 3,493,762 | 2/1970 | Dulebohn | 250/202 |
| 3,670,153 | 6/1972 | Rempert et al. | 250/202 X |
| 3,704,373 | 11/1972 | Bardwell et al. | 250/202 |

*Primary Examiner*—Walter Stolwein
*Attorney, Agent, or Firm*—Lew Schwartz; Wayne A. Sivertson

[57] ABSTRACT

A line tracer having a scanning head optically connected to a rotatable spindle. The spindle carries a first set of photosensitive elements at a location spaced from its rotation axis for the purpose of orienting the spindle to a "direction" indicative of the direction of a line portion being viewed by the scanning head. A second set of photosensitive elements is carried by the rotating spindle at its axis of rotation for generating an error signal. A signal representing the orientation of the rotating spindle is combined with the error signal thereby providing accurate control over the scanning head.

15 Claims, 5 Drawing Figures

LINE TRACING APPARATUS

BACKGROUND OF THE INVENTION

Machines which automatically trace a line or template for the purpose of controlling a slave machine are well-known. One example of such a machine is found in U.S. Pat. No. 3,403,263 issued Sept. 24, 1968 to Charles W. Hargens III. In this system, a plurality of fibre optic bundles originate in a spaced array within the scanning head and terminate at a plurality of photocells. The configuration of the fibre optic bundle array at the scanning head is determined by the coordinate system being employed and, for a Cartesian coordinate system, it is either a straight line or two straight lines which cross to form the traditional X–Y axes. The photocells at which the fibre optic bundles terminate are each associated with a resistance and form a part of a bridge circuit. When the scanning head is accurately following the line, the bridge is balanced and no change in direction is imparted to the scanning head. However, when the direction of the line changes, the bridge becomes unbalanced and the scanning direction changes under its control. In the Cartesian coordinate embodiment, either the X or Y axis drive is employed as an independent drive with the other being regulated to maintain the scanning head in proper relation to the line being traced. The selection of the independent axis is controlled through the direction of the line in relation to the X and Y axis.

Tracing systems such as that disclosed in the Hargens patent can be termed "centered" systems in that the photocells which provide the basic control signals operate on line images from the tracing center. While systems of this type have an inherent accuracy they have proven to be unstable in that they cannot anticipate changes in line direction. One method of increasing the stability of optical tracers is disclosed in U.S. Pat. No. 3,493,762 issued Feb. 3, 1970, to David H. Dulebohn. Here, the steering or control elements are positioned ahead of the tracing center creating what has been termed a "premature view." In this system, the tracer can anticipate changes in line direction and, thus, can trace a line in a more stable manner thereby allowing a more rapid tracing operation. However, this increase in stability has an attendant loss in accuracy which is compounded by the fact that various system components are not themselves totally accurate.

BRIEF SUMMARY OF THE INVENTION

The present invention provides a tracing system employing a premature view with its enhanced stability and further provides an error detection system to increase the tracing accuracy. A first set of photosensitive elements is positioned ahead of the tracing center to create the premature view and thereby allow the tracing system to anticipate changes in line direction. A second set of photosensitive elements is positioned at the tracing center and any deviation of these elements from the line being traced is used to produce an error signal which is summed with the tracing control signal generated through the use of the premature view elements. In this manner, the stability of the premature view approach is maintained with a greatly enhanced accuracy.

DETAILED DESCRIPTION OF THE DRAWINGS

Figure 1:
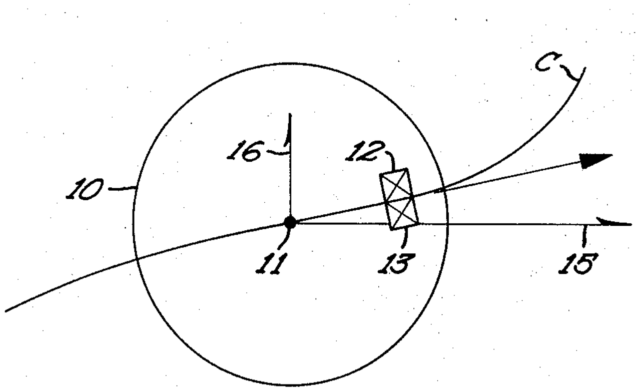
Fig 1 PRIOR ART
FIG. 1 is an illustration of a prior art premature view tracer.

FIG. 1 illustrates a prior art premature view tracing system. A rotatable spindle 10 having a tracing center 11 supports a pair of photocells 12 and 13 at a position spaced from the tracing center 11. As described in U.S. Pat. No. 3,493,762, the photocells 12 and 13 balance on the line to be traced C thereby indicating the direction of the line at the tracing center 11. When a tracing rate is combined with the line direction, a tracing vector 14 is generated. This tracing vector 14 can be resolved through the proper application of many prior art devices to an X axis component 15 and a Y axis component 16. As described in U.S. Pat. No. 3,493,762, these X and Y axis components can be employed to drive a scanning head such that it will follow a line C as well as control a slave machine. It should be pointed out with reference to FIG. 1, that so long as the spindle center 11 remains upon the line C the tracing direction as illustrated by the vector 14 is accurate within the limits of the system components.

Figures 2, 4:
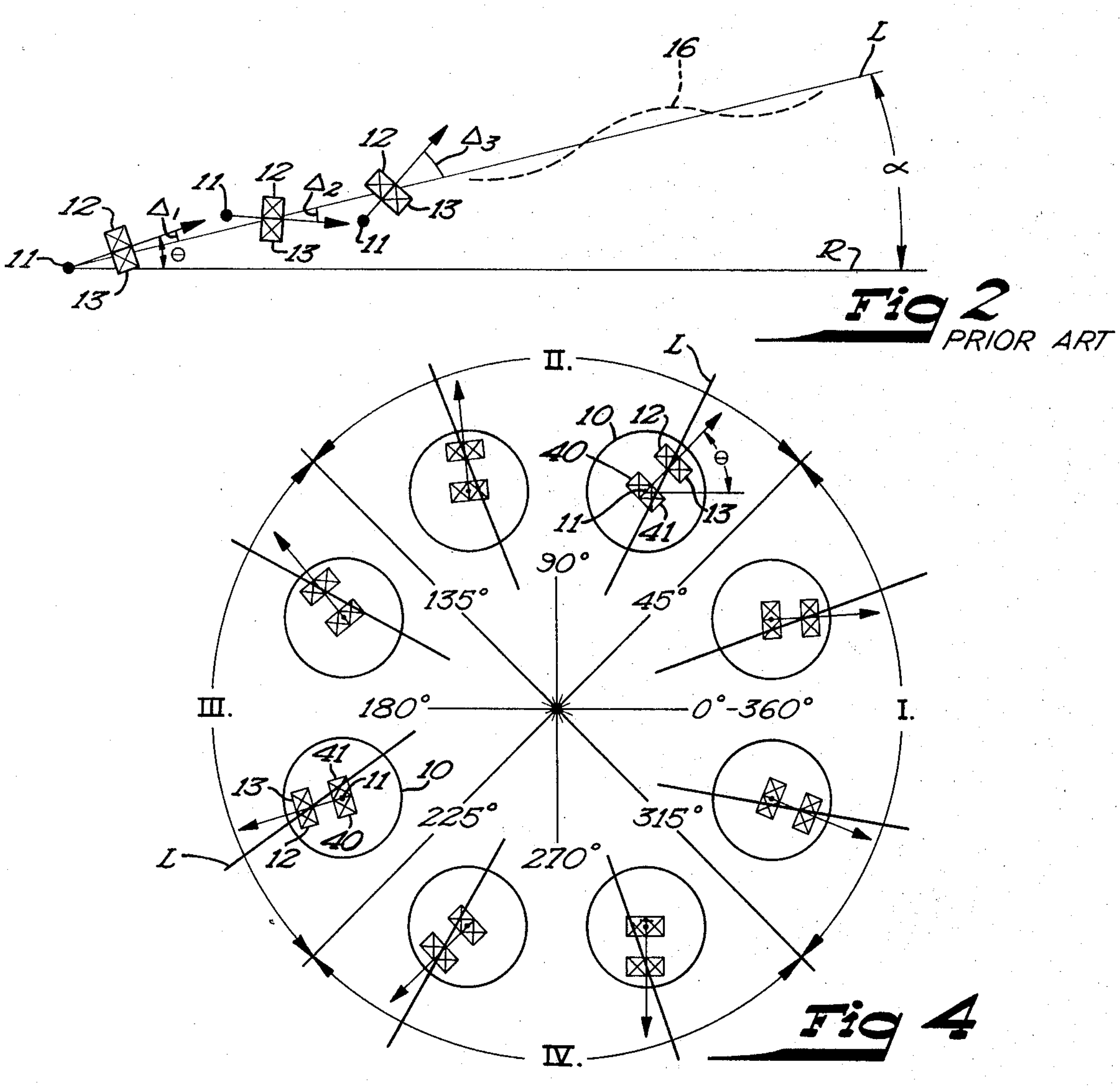
Fig 2 PRIOR ART, Fig 4
FIG. 2 is an illustration of the inaccuracies found in a prior art tracer of the type illustrated in FIG. 1.
FIG. 4 is a Cartesian coordinate system.

Referring now to FIG. 2, there is shown a progressive illustration of the prior art system shown in FIG. 1 as it traces a straight line L. The line L forms an angle $\alpha$ with a reference line R here shown as the X axis. In the left portion of FIG. 2, the spindle center 11 is shown positioned upon a line L. The photocells 12 and 13 however, are not precisely balanced on the line L thereby producing a tracing angle $\theta$ which differs from the line angle $\alpha$ by an angle $\Delta_1$. The factors contributing to the error illustrated as $\Delta_1$ are largely the inaccuracies found in the system components. Thus, inasmuch as these inaccuracies are present in all components no matter how precise their design, it is to be expected that an error of the type illustrated as $\Delta_1$ will be present in all tracing systems.

Moving to the right in FIG. 2, there is illustrated a second position of the tracing center 11 and photocells 12 and 13 with respect to the line L. As the tracer moves along the angle $\theta$ illustrated in the left portion of FIG. 2, the deviation of the angle $\theta$ from the angle $\alpha$ causes the tracing center to be pulled off of the line L. The tracing action continues at the angle $\theta$ until such time as the photocells 12 and 13 are able to sense an error and reorient themselves with respect to the line L. A second error is illustrated as $\Delta_2$ which results from the spindle center 11 being off the center of line L. Again, moving to the right in FIG. 2, the photocells 12 and 13 and tracing center 11 move with respect to the line L and reorient themselves again with respect to line L thereby producing a third error illustrated in FIG. 2 as $\Delta_3$. As this process continues to the right in FIG. 2, the spindle center 11 will move back and forth across the line L as shown by the dotted line 16.

From the discussions with respect to FIG. 2, it is clear that some tracing error is inherent in the inaccuracy of the system components. However, by maintaining the spindle center upon the line to be traced the greatest inaccuracies in the tracing system can be eliminated.

Figure 3:
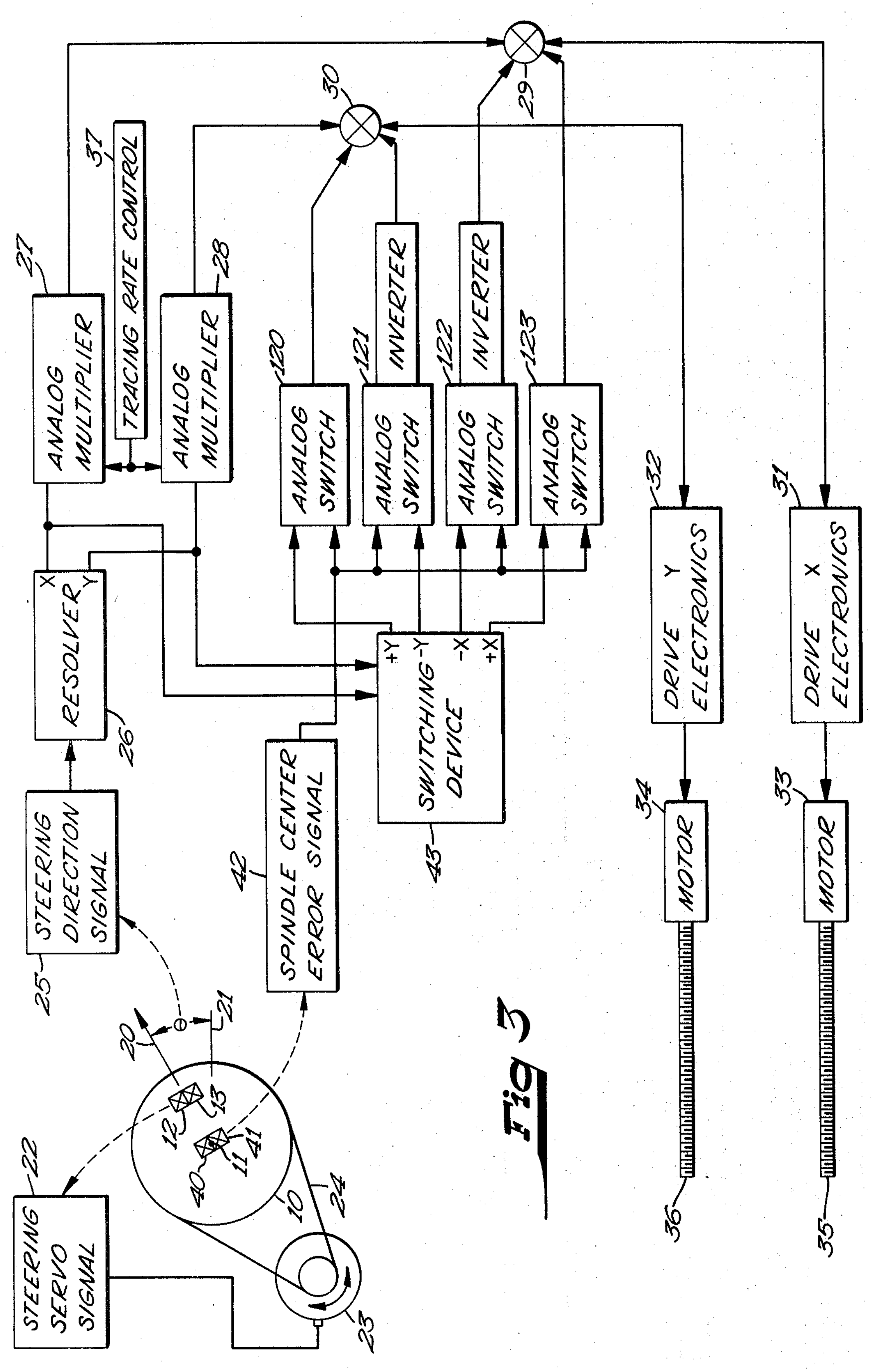
FIG. 3 is a block diagram of the tracing system of the present invention.

Referring now to FIG. 3 wherein there is shown the tracing system of the present invention. For purposes of illustration, this system is illustrated as an improvement over a system of the type having a scanning head for moving along a line to be traced while viewing reference portions of the line and an optical system for presenting images of the viewed line portions to a rotatable spindle. Such a system is shown in U.S. Pat. No. 3,493,762 which is hereby incorporated by reference. It is to be understood, however, that the present invention may be practiced otherwise than as an improvement to the specific embodiments shown in said patent and that the spindle may be carried by the scanning head or held stationary while the line images are directed to it.

FIG. 3 illustrates a rotatable spindle 10 of the type illustrated in U.S. Pat. No. 3,493,762 having photocells 12 and 13 spaced from the tracing center 11. These elements perform essentially the same as the elements with like numerals illustrated in FIG. 1. The rotatable spindle 10 has a steering direction or orientation defined by the arrow 20 which corresponds in direction to the vector 14 of FIG. 1, the orientation of the spindle 10 being defined in terms of a steering angle $\theta$ which is the angle the steering direction makes with a reference line (the X axis 21, for example). The photocells 12 and 13 form a part of a bridge circuit in a known manner, and, as the line being traced changes in direction from the steering direction 20, a steering error signal is generated by the photocells 12 and 13. The steering error signal is transformed into a steering servo-signal 22 in known manner which servo-signal is applied to a servo-motor 23. The servo-motor 23 is a bi-directional motor whose rotation is dependent upon the servo-signal. Upon receipt of a steering servo-signal, the servo-motor 23 rotates in the appropriate direction and, through a belt 24, rotates the spindle 10 such that the photocells 12 and 13 are again in balance and the steering direction as illustrated by arrow 20 is again in conformity with the direction of the line portion being seen by the photocells 12 and 13.

The orientation of the rotatable spindle 10 as illustrated by the steering angle $\theta$, is transformed into a steering direction signal 25 in known manner. The steering direction signal is resolved by a resolver 26 into X axis and Y axis components in a manner identical to that accomplished through the use of the trigonometric functions. The X and Y components are then transmitted to analog multipliers 27 and 28 which function to provide a tracing rate and are controllable as at 37 either manually by an operator or automatically through a program which alters the tracing rate upon the occurrence of certain events in a known manner. The X and Y components are then applied to the summing nodes 29 and 30 which transmit a signal to the drive electronics 31 and 32 respectively which operate upon the servo-motors 33 and 34 connected to X and Y axis lead screws 35 and 36 of the tracer. The various functional elements described above with the exception of the summing nodes 29 and 30, are all found and fully described within U.S. Pat. No. 3,493,762 and are therefore not described in greater detail herein. Further, it is to be understood that while the system described herein is expressed in terms of controlling the tracer lead screws 35 and 36, the various signals generated by this system may be employed to control a slave machine in any known manner, for example, the manner described in said patent.

In addition to the photocells 12 and 13 the rotatable spingle 10 also carries two photocells 40 and 41 which are located substantially at the tracing center 11. The photocells 40 and 41 are connected into a bridge circuit in a manner similar to that of the photocells 12 and 13 and are positioned on either side of the spindle center 11 such that the bridge containing the photocells 40 and 41 is balanced when the line being traced passes through the tracing center 11. If the spindle center should leave the line being traced (see FIG. 2) the bridge circuit containing the photocells 40 and 41 will become unbalanced thereby producing a spindle center error signal 42. This error signal is an analog signal, its magnitude being dependent upon the amount of deviation of the tracing center 11 from the line being traced with its polarity being dependent upon the direction of the deviation. It can be seen that this signal indicates the direction and magnitude of a difference between the tracing direction and the direction of the line portion being viewed by the photocells 12 and 13. The spindle center error signal is transmitted to analog switches 120, 121, 122 and 123 which also receive the outputs from a switching device 43. The switching device 43 takes the X and Y component signals from the resolver 26 and, in a manner to be described below, determines the axis (X or Y) to which the error signal is to be applied as well as the manner in which it is to be applied. The output of the switching device 43 is shown as one of +X, −X, +Y or −Y and operates the appropriate analog switch 120, 121, 122 or 123 in a manner so that the center cell error signal is properly polarized and conducted to either summing node 29 or 30. Thus the center cell error signal is applied to speed up or slow down the rotation rate of the appropriate lead screw 35 or 36 altering what is indicated by the signals from analog multipliers 27 and 28. This application of the center cell error signal has the net effect of changing the tracing direction. With the lead screws 35 or 36 operating under the control of only the steering angle $\theta$, the tracing direction will deviate from the actual line direction by an angle shown as $\Delta_1$, $\Delta_2$ or $\Delta_3$ in FIG. 2 causing the spindle center 11 to cross from one side to the other side of the center of the line L. When the spindle center error signal is properly summed with the X and Y components of the steering direction $\theta$ under the control of the switching device 43, the greatest portion of this deviation is eliminated, and the tracing center 11 accurately follows the center of the line being traced.

Referring to FIG. 4 wherein there is shown a two dimensional cartesian coordinate system having an X and Y axis with dotted lines bisecting the right angles formed by the coordinates. The quadrants formed by the dotted lines are numbered, I, II, III and IV and in each of these guadrants I have twice illustrated the rotatable tracing head with the photocell configuration previously shown in FIG. 3. A portion of the line L being traced is drawn so that it passes under the tracing head to the ring of the center 11 in all of these illustrations, thus shading cell 41 and exaggerating a tracing error position in each case. These figures and the guadrant system will now be used to explain how and why the center cell error signal is polarized and appropriately applied to summing nodes 29 and 30 by the switching device 43. The shading of cell 41 produces a positive center cell bridge error signal.

In guadrant I when the line portion being traced is between 0° and 45°, the error by the position of the center 11 with respect to the center of the line L can be corrected by either increasing the X rate component or decreasing the Y rate component, or both. However, most efficient, stable, and simple operation of the tracing system is accomplished by summing the center cell error signal into only one axis at a time, the one axis being the one that requires the smallest rate change to eliminate the center cell error signal. The switching device 43 selects the optimal correction axis X or Y, and polarizes the center cell error signals so that the drive rate of the optimal correction axis is increased or decreased to eliminate the center cell error signal.

In quadrant I, the summing of a negative drive rate into the Y axis drive rate component eliminates the center cell error signal shown in FIG. 4 by decreasing the positive Y axis drive rate between 0° and 45° and by increasing the negative Y axis drive rate between 315° and 0°. The switching device 43 specifies that the steering direction is in quadrant I by producing an output signal at −Y (FIG. 3) Y being the drive axis to be corrected and the − indicating an inversion of the positive signal generated by the shading of center photocell 41. This −Y signal operates analog switch 121 and a negative (positive inverted) drive rate signal from the center cell bridge circuit is summed into the Y axis drive electronics through node 30 to eliminate the error signal. In quadrant I the shading of cell 40 produces a negative drive rate signal which is inverted to increase the Y axis drive rate between 0° and 45°, and decrease the rate between 315° and 0°.

In quadrant II the X axis is the optimal correction axis because it requires the smallest rate change to eliminate the center cell error signal. The switching device 43 selects this axis by producing a signal at +X output (FIG. 3), X being the optimal correction component. This signal operates analog switch 123 and the positive drive rate signal generated by the shading of photocell 41 is summed into the X axis drive electronics at node 29. This positive signal increases the positive drive rate of the X axis between 45° and 90°, and decreases the negative drive between 90° and 135° to eliminate the center cell error signal. A negative error signal from the center cell bridge as by the shading of cell 40 produces opposite correction drive signals.

In quadrant III switching device 43 produces an output signal at +Y which operates analog switch 120 allowing a positive center cell drive rate signal to be summed into the Y axis drive electronics at node 30. This positive signal increases the positive Y axis drive rate between 135° and 180°, and decreases the negative Y axis drive rate between 180° and 225° to eliminate the center cell error signal.

In quadrant IV switching device 43 produces an output signal at −X which operates analog switch 122 allowing a negative (positive inverted) signal from the center cell bridge to be summed at node 29. This negative signal increases the negative drive rate of the X axis between 255° and 270° and decreases the positive X axis drive rate between 270° and 315° to eliminate the center cell error signal.

Thus by changing its output signal at 45°, 135°, 225° and 315°, the switching device 43 denotes travel direction quadrants I, II, III, IV, and operates the analog switches to gate the center cell error signal to the appropriate summing node 29 or 30. The polarity of the center cell error signal specifies the drive rate increase or decrease as is required to eliminate the center cell error signal.

It can further be seen from FIG. 4 that a steering angle hovering around any of the dotted correction change demarcation lines can result in a constant switching between corrections in two different directions. For this reason, I have determined that the change in correction direction should not occur until the steering angle has gone past any of the correction demarcation lines and this feature is built into my system in a manner to be described below.

Figure 5:
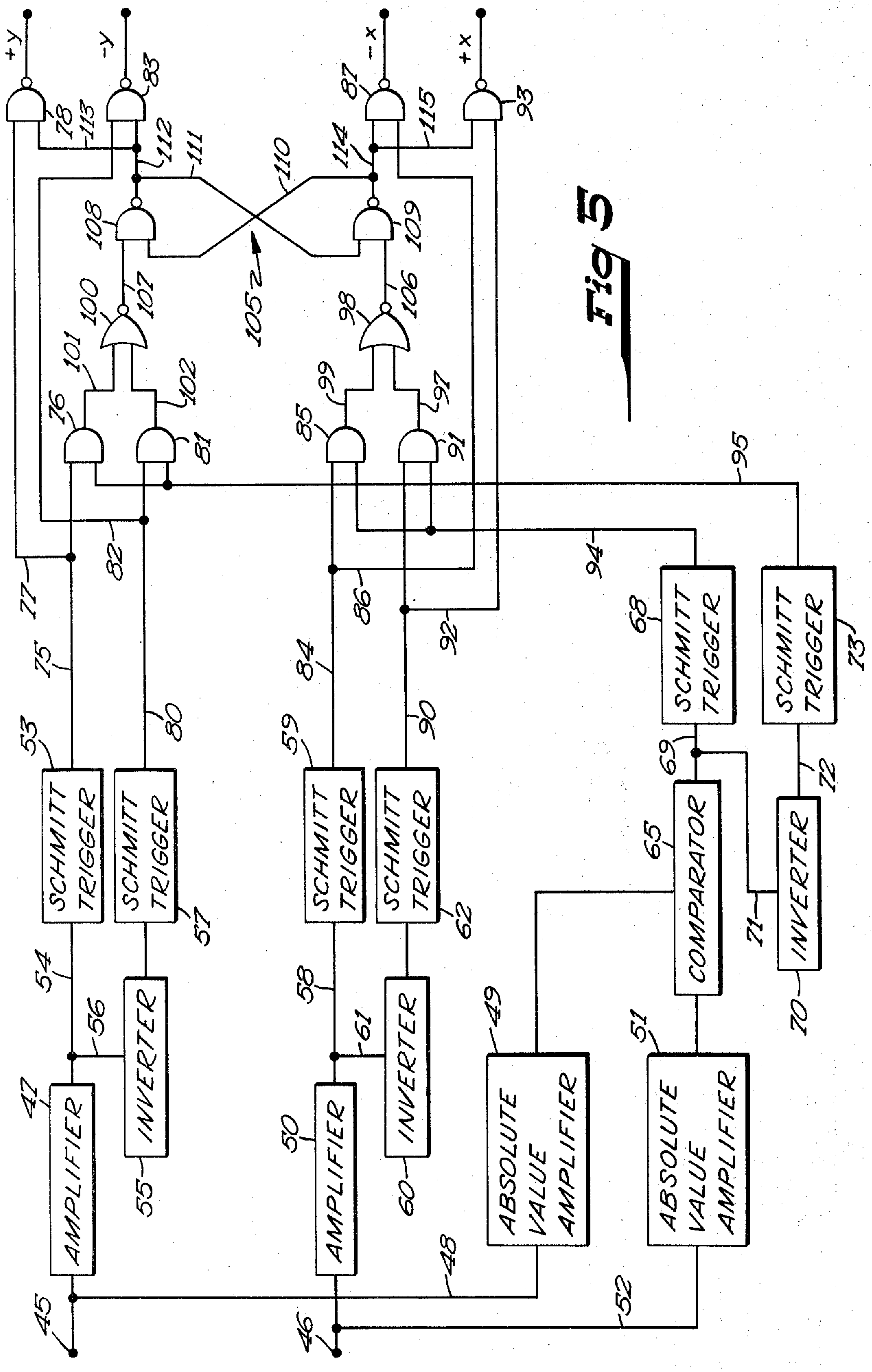
FIG. 5 is a block diagram of a portion of FIG. 3.

Referring now to FIG. 5, there is shown the logic for determining the optimal correction coordinate, which logic forms the switching device 43. A first pin 45 is connected to the X output of the resolver 26 and a second pin 46 is connected to the Y output of resolver 26. Signals appearing at pin 45 are applied to an amplifier 47 and also are transmitted by a line 48 to an absolute value amplifier 49. Signals appearing at pin 46 are transmitted to an amplifier 50 similar to the amplifier 47 as well as to an absolute value amplifier 51 by a line 52. Amplifiers 47 and 50 are of the type which typically invert the signal although it is to be understood that non-inverting amplifiers can also be used with appropriate changes in system components. The output of the amplifier 47 is transmitted to a Schmitt trigger signal circuit 53 by a line 54 and to an inverter 55 by a line 56. The output of the inverter 55 is transmitted to a Schmitt trigger 57 generally identical to the Schmitt trigger 53. The output of the amplifier 50 is transmitted by a line 58 to a Schmitt trigger 59 and to an inverter 60 by a line 61. The output of the inverter 60 is transmitted to a Schmitt trigger 61. The Schmitt triggers 59 and 62 are generally identical to the Schmitt triggers 53 and 57.

The absolute value amplifiers 49 and 51 have their outputs connected to a comparator 65 by lines 66 and 67. The comparator is of the type having a positive output when the signal appearing at pin 46 is greater than the signal appearing at pin 45 and a negative output when the signal appearing at pin 45 is greater. The output of the comparator 65 is transmitted to a Schmitt trigger 68 over line 69 and to an inverter 70 over a line 71. The inverter output is transmitted by a line 72 to a Schmitt trigger 73.

Recalling that the signals appearing at pins 45 and 46 can be either positive or negative, it can be seen that only one of the Schmitt triggers 53 and 57 and one of the Schmitt triggers 59 and 62 can be triggered. Further, these four Schmitt triggers are selected to be compatible with the amplification factors of the amplifiers 47 and 50 such that any output from the amplifiers 47 and 50 will be sufficient to trigger them.

As can be seen, the signal from the Schmitt triggers 68 and 73 are representative of the relative magnitude of the signals appearing at pins 45 and 46 while the signals from Schmitt triggers 53, 57, 59 and 62 are indicative of their polarity. The output of the Schmitt trigger 53 is transmitted by a line 75 to an AND gate 76 and by a line 77 to a NAND gate 78. The output from Schmitt trigger 57 is transmitted by a line 80 to an AND gate 81 and by a line 82 to a NAND gate 83. The output of Schmitt trigger 59 is transmitted by a line 84 to an AND gate 85 and by a line 86 to a NAND gate 87. The output of Schmitt trigger 62 is transmitted by a line 90 to an AND gate 91 and by a line 92 to a NAND gate 93. The output of Schmitt trigger 68 is transmitted by a line 94 to AND gates 85 and 91 while the output of Schmitt trigger 73 is transmitted by a line 95 to AND gates 76 and 81. The output of AND gate 91 is transmitted by a line 97 to a NOR gate 98 to which the output of AND gate 85 is also connected by a line 99. Similarly, AND gates 76 and 81 are connected to NOR gate 100 by lines 101 and 102 respectively. NOR gates 98 and 100 have their outputs connected to a latch 105 by means of lines 106 and 107. The latch is composed of two NAND gates 108 and 109 with feedback lines 110 and 111. A "low" signal appearing on either of lines 106 or 107 will set the latch in known fashion. The output of the NAND gate 108 is connected to the NAND gate 83 by means of a line 112 and to a NAND gate 78 by means of a line 113. The output of the NAND gate 109 is connected to the NAND gate 87 by means of a line 114 and to a NAND gate 93 by means of a line 115.

In operation, and assuming a steering angle between 0° and 45°, the signal applied to pins 45 and 46 will be positive with the signal applied to pin 45 being greater than that applied to pin 46. Since the amplifiers 47 and 50 have a natural inversion, Schmitt trigger 53 will have a "low" output while Schmitt trigger 57 will have a "high" output. Similarly, Schmitt trigger 57 will have a "low" output while Schmitt trigger 62 will be "high." Also, the comparator 65 will have a "low" output as the signal applied to pin 45 is greater than pin 46 thus leading, in this example, to a "low" output from comparator 65. Assuming that the "high" signal from the inverter 70 is sufficient to fire Schmitt trigger 73, Schmitt trigger 73 will have a "high" output while Schmitt trigger 68 will be "low." With the Schmitt triggers set as described, the output from AND gates 76, 85 and 91 will be "low" while AND gate 81 will be "high." Thus, NOR gate 98 will be "high" while NOR gate 100 will be "low." The "low" signal appearing on line 107 will set the latch 105 thereby producing a "low" on line 114 and thus one of the inputs to NAND gates 87 and 93. Similarly, a "high" will appear on line 112 thus creating a "high" input to NAND gates 78 and 83. Through the operation of the lines 77, 82, 86 and 92, the outputs of Schmitt triggers 53, 57, 59 and 62 will be applied as inputs to the NAND gates 78, 83 and 93 and, in the example under discussion, the output of NAND gate 83 will be low while the others are high.

By following the same analysis for a tracing angle between 315° and 360° (0°) it is seen that NAND gate 83 is again "low" while gates 78, 87 and 93 are "high". Similarly, for tracing angles between 45° and 135°, gate 93 will be "low." Gate 78 is "low" for tracing angles between 135° and 225°, while gate 87 is "low" for tracing angles between 225° and 315°. This is shown in FIG. 5 by designating the output of gate 78 as +Y, gate 83 as −Y, gate 87 as −X and gate 93 as +X, the X or Y designating the optimal correction coordinate and the + and − indicating an inversion explained above.

Assuming a tracing angle between 0° and 45° and an error signal generated by the shading of spindle center photocell 41, it can be seen that a decrease in the Y drive component (i.e. a slowdown of the Y axis lead screw) is necessary to compensate for the error. Conversely, for a tracing angle between 135° and 180° an error signal generated by the shading of spindle center photocell 41 will require an increase in the Y coordinate to compensate for the error. Recalling that NAND gate 83 is "low" for tracing directions between 0° and 45° and NAND gate 78 is "low" for tracing directions between 135° and 180°, it can be readily seen that an error compensation can be applied to the compensating coordinate (Y in this example) in a magnitude determined by the signal generated by the spindle center photocells 40 and 41 and in a direction determined by the spindle center photocells 41 and 42 and the NAND gates 78 and 83, in this example, the polarity being inverted after analog switch 121.

Assuming that the steering angle lies between 0° and 45° but the Y component is getting larger as the direction approaches the 45° switching demarcation line, it can be seen that the output of the comparator 65 will decrease. At the point when the output of the comparator 65 is insufficient to fire either of the Schmitt triggers 68 or 73 a "low" will appear on both of lines 94 and 95. However, the latch 105 will maintain the output NAND gates in their present state until such time as the steering angle has gone sufficiently beyond the 45° demarcation line to generate a signal sufficient to fire Schmitt trigger 68 thereby resetting latch 105 and altering the state of the output NAND gates. This effect in delaying the switching of the correction direction until such time as the steering angle has passed the correction demarcation line maintains switching logic stability as the tracer traces lines whose directions are close to the switching demarcation lines. This hysteresis effect which is accomplished through the combination of the comparator 65 and Schmitt triggers 68, 73, and the latch 105 has obvious advantages to the efficiency, stability and accuracy of the tracing operation. In addition, the latch 105 will maintain the proper logic condition when the signal at either pin 45 or 46 goes to zero as when the steering angle coincides with one of the coordinate axes.

Obviously many modifications and variations of the present invention are possible in light of the above teachings. An example of such a modification would be to substitute a triple input gate in place of the output gates 70, 83, 87 and 93 with a third input being biased "high." With this configuration, if the machine should shut down or, for any other reason, there are no inputs to pins 45 and 46 the third biased pin will drive all of the output gates high to turn off the correction signal. It is therefore to be understood that, within the scope of the appended claims, the invention may be practiced otherwise than as specifically described.

What is claimed is:

1. In a tracer of the type having a scanning head for movement relative to a line to be traced while viewing reference portions of said line, means for generating a signal indicative of the direction of said viewed line portion, means for resolving said line portion direction signal into X axis and Y axis components and means responsive to said line portion direction signal components for driving said scanning head in said indicated direction, the improvement which comprises:

means for detecting an error in said line portion direction signal, said error detecting means including means for generating a signal representative of an error in said line portion direction signal; and means for selectively summing said error signal with one or the other of said X axis and Y axis components, said scanning head driving means being responsive to said selectively summed X axis and Y axis components to drive said scanning head in accordance therewith.

2. The tracer of claim 1 wherein said selective summing means includes means responsive to the magnitude and direction of said X-axis and Y-axis components for selecting one of said X-axis and Y-axis components to sum with said error signal.

3. The tracer of claim 2 wherein said magnitude and direction responsive means includes hysteresis means for stabilizing said selective summing means.

4. In a tracer of the type having a scanning head for movement relative to a line to be traced while viewing reference portions of said line, rotatable means having an angular orientation indicative of the direction of the viewed line portion, means for detecting a change in direction from one line portion to another, means responsive to said direction change detecting means for angularly reorientating said rotatable means in accordance with a direction change between viewed line portions, and means for generating a scanning head driving signal indicative of the angular orientation of said rotatable means, said driving head signal generating means including means for resolving said driving head signal into X axis and Y axis components, the improvement which comprises:

means for detecting an error in the angular orientation of said rotatable means, said error detecting means including means for generating a signal representative of an error in the angular orientation of said rotatable means; and means for selectively summing said error signal with one or the other of said X axis and Y axis components.

5. The tracer of claim 4 wherein said scanning head driving signal generating means comprises means for resolving said signal into X-axis and Y-axis components, said combining means including means for selectively summing said error signal with one of said X-axis and Y-axis component.

6. The tracer of claim 5 wherein said selective summing means includes means responsive to the magnitude and direction of said X-axis and Y-axis components for selecting one of said X-axis and Y-axis components to sum with said error signal.

7. The tracer of claim 6 wherein said magnitude and direction responsive means includes hysteresis means for stabilizing said selective summing means.

8. In a device of the type described, the combination comprising:

scanning means for movement relative to a line to be traced while viewing referenced portions of said line;

means rotatable about an axis;

optical means for presenting images of said viewed line portions to said rotatable means;

means responsive to said line portion images for maintaining said rotatable means in an angular orientation indicative of the direction of a viewed line portion, said orientation maintaining means comprising first photosensitive means supported by said rotatable means and spaced from said axis;

means operably connected to said rotatable means for generating a signal indicative of its angular orientation;

means, including second photosensitive means supported by said rotatable means generally at its axis, for generating a signal representative of a difference between said viewed line portion direction and the angular orientation of said rotatable means; and means for combining said difference signal and said rotatable means angular orientation signal.

9. The combination of claim 8 wherein said orientation indicative signal generating means comprises means for resolving said rotatable means orientation signal into X-axis and Y-axis components, said combining means including means for selectively summing said difference signal with one of said X-axis and Y-axis components.

10. The combination of claim 9 wherein said selective summing means includes means responsive to the magnitude and direction of said X-axis and Y-axis components for selecting one of said X-axis and Y-axis components to sum with said difference signal.

11. The tracer of claim 10 wherein said magnitude and direction responsive means includes hysteresis means for stabilizing said selective summing means.

12. In a tracer of the type having a scanning head for movement relative to a line to be traced while viewing reference portions of said line, rotatable means having an angular orientation indicative of the direction of a viewed portion, first photosensitive means supported by said rotatable means and spaced from its axis of rotation for detecting a change in direction from one line portion to another, means responsive to said first photosensitive means for angularly reorienting said rotatable means in accordance with a direction change from one line portion to another and means for generating a scanning head driving signal indicative of the angular orientation of said rotatable means, the improvement which comprises:

second photosensitive means supported by said rotatable means generally at its axis of rotation for detecting an error in the angular orientation of said rotatable means;

means responsive to said second photosensitive means for generating a signal representative of an error in the angular orientation of said rotatable means; and means for combining said scanning head driving signal and said error signal.

13. The tracer of claim 13 wherein said scanning head driving signal generating means comprises means for resolving said signal into X axis and Y axis components, said combining means including means for selectively summing said error signal with one of said X axis and Y axis components.

14. The tracer of claim 14 wherein said selective summing means includes means responsive to the magnitude and direction of said X axis and Y axis components for selecting one of said X axis and Y axis components to sum with said error signal.

15. The tracer of claim 15 wherein said magnitude and direction responsive means includes hysteresis means for stabilizing said selective summing means.

* * * * *